United States Patent
Lee et al.

(10) Patent No.: US 10,011,266 B2
(45) Date of Patent: Jul. 3, 2018

(54) METHOD AND CONTROLLER FOR PREVENTING OVER DISCHARGE OF BATTERY AND HYBRID VEHICLE THERERBY

(71) Applicant: Hyundai Motor Company, Seoul (KR)

(72) Inventors: Hae-Seung Lee, Yongin-Gyeonggi-do (KR); Se-Geun Kim, Gyeonggi-do (KR); Dong Shin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 101 days.

(21) Appl. No.: 15/361,810

(22) Filed: Nov. 28, 2016

(65) Prior Publication Data

US 2017/0197608 A1 Jul. 13, 2017

(30) Foreign Application Priority Data

Jan. 7, 2016 (KR) .................. 10-2016-0001898

(51) Int. Cl.
*B60W 20/13* (2016.01)
*H02J 7/00* (2006.01)
(Continued)

(52) U.S. Cl.
CPC .......... *B60W 20/13* (2016.01); *B60L 11/1859* (2013.01); *B60L 11/1861* (2013.01);
(Continued)

(58) Field of Classification Search
CPC ................ B60W 20/13; B60W 20/40; B60W 2510/0241; B60W 2550/14; B60W 2710/0666; B60W 2510/0208; H02J 7/00; B60L 11/1859; B60L 11/1862; B60L 11/1861; B60L 2240/642; B60L 2240/443;
(Continued)

(56) References Cited

U.S. PATENT DOCUMENTS 6,223,106 B1 * 4/2001 Yano ........................ B60K 6/28
180/165
6,366,059 B1 * 4/2002 Wakashiro ............... B60K 6/48
180/65.25
(Continued)

FOREIGN PATENT DOCUMENTS

JP 2005-207385 A 8/2005
JP 2006-183841 A 7/2006
(Continued)

*Primary Examiner* — Jaime Figueroa
(74) *Attorney, Agent, or Firm* — Mintz Levin Cohn Ferris Glovsky and Popeo, P.C.; Peter F. Corless

(57) ABSTRACT

A method for preventing over discharge of a battery includes steps of: detecting a gradient of a road on which a vehicle is running by a controller, when a battery is discharged under a state that an engine of the running vehicle is operated, detecting a clutch driving state of an engine clutch, which connects or disconnects the engine and an electric motor, after detecting the road gradient, detecting a SOC (State of Charge) of the battery after detecting the clutch driving state of the engine clutch, and carrying out a torque reserve control allowing more torque to be reserved in the engine, using a combination of the road gradient, the clutch driving state, and the battery SOC, such that the battery SOC is not lowered below a certain amount.

12 Claims, 2 Drawing Sheets

(51) Int. Cl.
*B60L 11/18* (2006.01)
*B60W 20/40* (2016.01)

(52) U.S. Cl.
CPC .......... *B60L 11/1862* (2013.01); *B60W 20/40* (2013.01); *H02J 7/00* (2013.01); *B60L 2240/443* (2013.01); *B60L 2240/507* (2013.01); *B60L 2240/642* (2013.01); *B60W 2510/0208* (2013.01); *B60W 2510/0241* (2013.01); *B60W 2550/14* (2013.01); *B60W 2710/0666* (2013.01); *B60Y 2300/91* (2013.01); *B60Y 2300/92* (2013.01); *B60Y 2400/112* (2013.01); *Y02T 10/7005* (2013.01); *Y02T 10/705* (2013.01); *Y02T 10/7044* (2013.01); *Y02T 10/7291* (2013.01); *Y02T 90/16* (2013.01); *Y10S 903/907* (2013.01)

(58) Field of Classification Search
CPC .............. B60L 2240/507; Y02T 90/16; Y02T 10/7005; Y02T 10/7044; Y02T 10/705; Y02T 10/7291; Y10S 903/907; B60Y 2300/91; B60Y 2300/92; B60Y 2400/112
USPC .......................................................... 701/22
See application file for complete search history.

(56) References Cited

U.S. PATENT DOCUMENTS

| | | | |
|---|---|---|---|
| 6,580,977 B2* | 6/2003 | Ding | B60L 11/1887 180/307 |
| 7,810,593 B2 | 10/2010 | Kiuchi | |
| 2013/0332020 A1* | 12/2013 | Uchihara | B60K 6/48 701/22 |
| 2015/0165916 A1* | 6/2015 | Kim | B60L 11/1809 320/109 |
| 2016/0167641 A1* | 6/2016 | Yoon | B60W 20/13 701/22 |
| 2016/0200314 A1* | 7/2016 | Tagami | B60K 6/46 701/22 |
| 2016/0272193 A1* | 9/2016 | Kim | B60W 20/40 |
| 2016/0280209 A1* | 9/2016 | Lian | B60W 20/13 |
| 2017/0008408 A1* | 1/2017 | Park | B60L 11/1861 |
| 2017/0096078 A1* | 4/2017 | Shin | B60W 20/13 |
| 2017/0096134 A1* | 4/2017 | Yoon | B60K 6/547 |

FOREIGN PATENT DOCUMENTS

| | | |
|---|---|---|
| KR | 10-0896216 B1 | 5/2009 |
| KR | 10-2012-0059260 A | 6/2012 |
| KR | 10-2013-0065434 A | 6/2013 |
| KR | 10-2014-0072520 A | 6/2014 |
| KR | 10-2015-0114749 A | 10/2015 |

* cited by examiner

METHOD AND CONTROLLER FOR PREVENTING OVER DISCHARGE OF BATTERY AND HYBRID VEHICLE THERERBY

CROSS-REFERENCE TO RELATED APPLICATION

This application claims under 35 U.S.C. § 119(a) the benefit of Korean Patent Application No. 10-2016-0001898, filed on Jan. 7, 2016, the entire contents of which are incorporated by reference herein.

BACKGROUND (a) Technical Field

The present invention relates to controlling a SOC (State of Charge) of a battery, and more particularly, to a hybrid vehicle equipped with a controller capable of preventing over discharge of a battery by a torque reserve control to an engine when an engine clutch slips.

(b) Description of the Related Art

In general, hybrid electric vehicles (HEVs) use an internal combustion engine and an electric motor as power sources which are classified as a parallel type, a serial type, or a mild type on the basis of a drive train structure, and also use a dual clutch transmission (DCT) in which an input shaft of an even gear set and an input shaft of an odd gear set are separately and respectively connected to two clutches.

In particular, the HEV operates either in an EV mode (Electric Vehicle Mode) under which only an electric motor is used as a power source, or in an REV mode (Hybrid Electric Vehicle Mode) under which both an engine and an electric motor are used as power sources, and it is equipped with an engine clutch for connecting/disconnecting the engine and the electric motor to switch between the EV mode and the HEV mode.

For example, an NC (Normally Close) type engine clutch carries out the HEY mode connecting the engine and the electric motor when it does not operate, while it carries out the EV mode disconnecting the engine and the electric motor when it operates.

Typically, driving states of the engine clutch are defined as: a "Slip" state under which a speed difference (rpm) between both ends of the clutch is greater than a certain value and friction of the clutch is initiated; a "Lock-up" state under which there is no speed difference between both ends of the clutch, and thus torque applied to an input shaft is transmitted to an output shaft by 100%; and an "Open" state under which the input and output shafts do not interfere with each other due to their physical separation. In this regard, each of the Slip, Lock-up, and Open states corresponds to one of states of the engine clutch, which are classified using hydraulic pressure of oil in a clutch and rebound pressure of a return spring, a speed difference between both ends of the clutch, input and output torques of the clutch, torque capacity of the clutch, and the like, and those states are determined in a hybrid control unit (HCU) that is an upper level controller of the HEV.

Accordingly, the Slip, Lock-up, and Open states of the engine clutch have influence on switching of EV mode/HEV mode of the HEV.

However, the Slip state of the engine clutch occurs prior to the Lock-up state, and thus puts a battery into a battery charge disable state, and at the same time, it cannot reduce an amount of battery usage even in a SOC that is not more than a certain amount and thus drop of the engine rpm occurs. Further, battery exhaustion that brings the battery SOC to be less than the certain amount or brings the battery to be discharged can disable driving of a hybrid vehicle, especially if the hybrid vehicle is unable to run on engine power alone. This condition may worsen at the time of running on an uphill road on which the vehicle repeatedly moves and stops and in turn slippage of the engine clutch occurs frequently.

In particular, when the vehicle is running on an uphill road, discharge of the battery to a SOC that is less than a certain amount can reduce drivability of the hybrid vehicle, e.g., when running on bendy roads in mountainous regions.

SUMMARY

An object of the present invention is to provide a controller for performing a method of preventing over discharge of a battery, such that a drop of engine rpm due to a battery SOC that is not more than a certain amount is prevented by allowing a battery to be consumed less if the SOC is not more than the certain amount when an engine clutch is under a Slip state and particularly, a state that the vehicle is not able to drive is prevented by preventing discharge of the battery on uphill roads, e.g., in mountainous regions, on which a slippage of the engine clutch occurs frequently. In addition, the present invention is directed to a hybrid vehicle equipped with such a controller.

In accordance of one aspect of the present invention, the present invention for obtaining the above object provides a method for preventing over discharge of a battery, comprising steps of: detecting gradient of a road on which a vehicle is running by a controller, when a battery is discharged under a state that an engine of the running vehicle is operated; detecting a clutch driving state of an engine clutch, which connects or disconnects the engine and an electric motor, by the controller after detecting the road gradient; detecting a SOC (State of Charge) of the battery by the controller after detecting the clutch driving state of the engine clutch; and carrying out a torque reserve control allowing more torque to be reserved in the engine by the controller, using a combination of the road gradient, the clutch driving state and the battery SOC, such that the battery SOC is not lowered below the certain amount.

In a preferred embodiment, the combination includes an uphill road of the road gradient, a Slip of the clutch driving state, and a charge threshold of the SOC. The combination is set as a factor for blocking battery discharge when the Slip occurs on the uphill road and a detection value of the SOC is smaller than the charge threshold, and the controller performs the torque reserve control when the factor for blocking battery discharge is set.

In a preferred embodiment, when the road gradient correspond to a flat road or a downhill road, the road gradient is set as a factor for maintaining battery discharge, wherein the controller maintains the battery discharge but do not perform the torque reserve control when the factor for maintaining battery discharge is set. When the clutch driving state of the engine clutch corresponds to any one of Lock-up and Open states, the clutch driving state is set as a factor for maintaining battery discharge, wherein the controller maintains the battery discharge but do not perform the torque reserve control when the factor for maintaining battery discharge is set. When the battery SOC is greater than the charge threshold, the battery SOC is set as a factor for maintaining battery discharge, wherein the controller maintains the battery discharge but do not perform the torque reserve control when the factor for maintaining battery discharge is set.

In a preferred embodiment, the road gradient is detected by a G sensor, wherein detection values of the G sensor are provided as input data to the controller. The battery SOC is detected by a battery management system (BMS), wherein detection values of the battery SOC are provided as input data to the controller.

In addition, in accordance of another aspect of the present invention, the present invention for achieving the above object provides a controller configured for use with a vehicle, including: the controller utilizing charge threshold values of SOC (State of Charge) of a battery when an engine clutch slips during running of the vehicle on an uphill road; the controller preventing over discharge of the battery by means of a torque reserve control when the battery SOC is less than the charge threshold under the condition of the uphill road and the Slip; and the controller including a clutch slip map in which classification of downhill, flat, and uphill roads depending on a road gradient, classification of Slip, Lock-up, Open states of the engine clutch, and charge threshold values of the battery SOC are established.

Further, in accordance of still another aspect of the present invention, the present invention for achieving the above object provides a hybrid vehicle comprising: a controller including a clutch slip map in which classification of downhill, flat, and uphill roads depending on a road gradient, classification of Slip, Lock-up, Open states of an engine clutch, and charge threshold values of SOC (State of Charge) of a battery are established, the controller utilizing charge threshold values of the battery SOC when an engine clutch slips during a vehicle runs on an uphill road, and the controller preventing over discharge of the battery by a torque reserve control when the battery SOC is less than the charge threshold value under the condition of the uphill road and the Slip; an engine and an electric motor as power sources, which are controlled by the controller and connected or disconnected to the engine clutch; a G sensor for detecting the road gradient; a battery which is controlled by a battery management system (BMS) such that the battery SOC is maintained by driving the electric motor and charging by the engine; a double clutch transmission (DCT) which is controlled by a torque control unit (TCU); and a hybrid starter and generator (HSG) connected to crank shafts of the engine to drive the engine when the engine is started.

In a preferred embodiment, the controller may be an electric control unit (ECU) for an engine and a hybrid control unit (HCU), and the HCU communicates with the controller via a CAN and acts as an upper level controller.

The method for preventing over discharge of a battery according to the present invention has an excellent effect that a battery SOC is maintained so as not to be lowered to a certain amount under a running state of a hybrid vehicle.

In addition, the hybrid vehicle according to the present invention has an effect that the battery SOC is maintained so as not to be lowered to a certain amount when the vehicle runs on an uphill road on which slippage of an engine clutch occurs frequently and thereby any suspension of operation due to over discharge of the battery is prevented.

Further, the hybrid vehicle according to the present invention prevents any suspension of operation due to over discharge of the battery even on roads in mountainous regions, on which condition of the uphill road is more worsen, and thus has an effect of improving merchantability.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
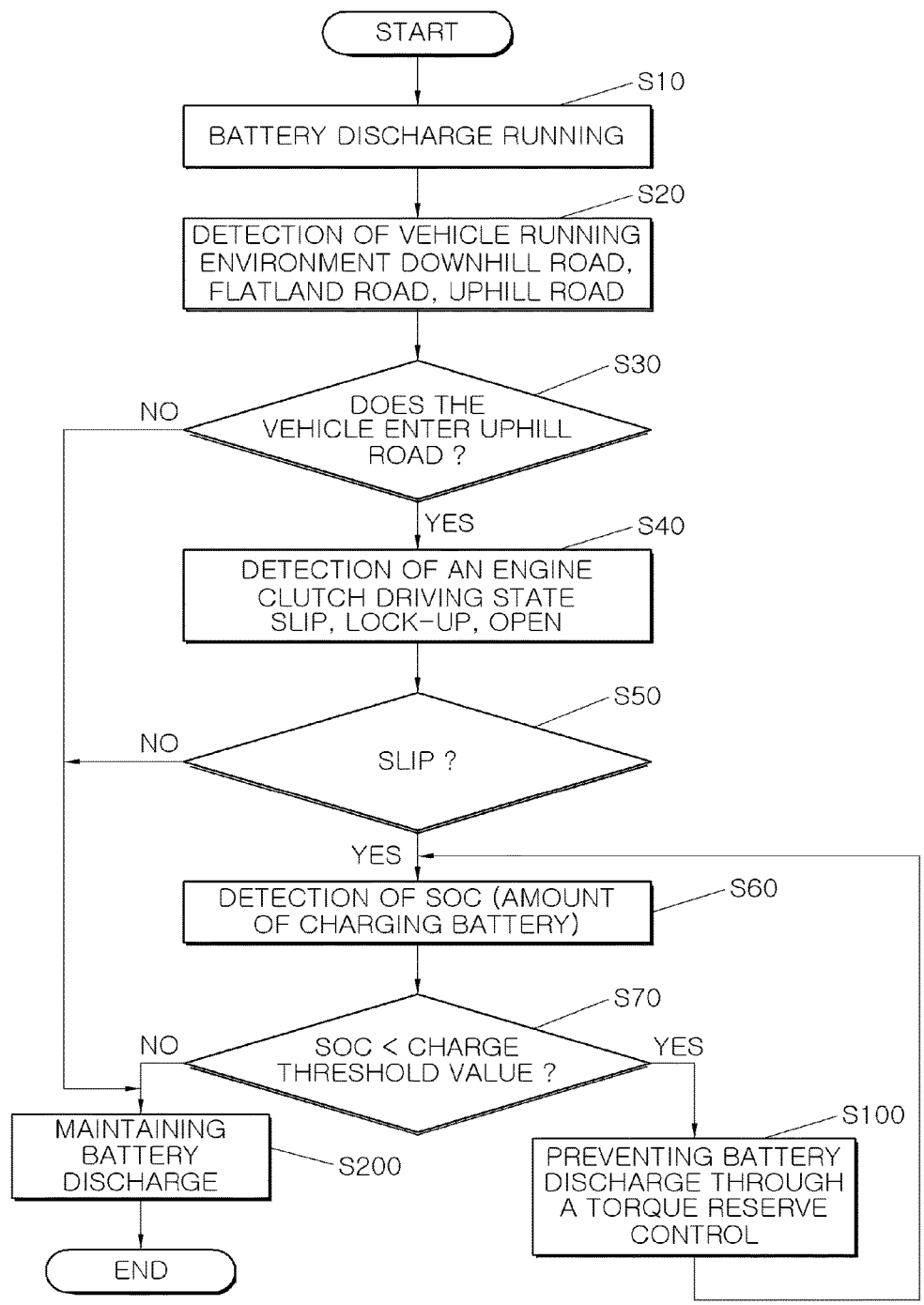
FIG. 1 is a flow chart of a method for preventing over discharge of a battery, according to the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Additional objects, advantages, and features of the invention will be more apparent to those of ordinary skill in the relevant art in view of the following detailed description of preferred embodiments and the accompanying drawings. If it is determined that detailed description of known relevant technologies may unnecessarily obscure the gist of the present invention in the description thereof, the detailed description thereof will be omitted. In addition, the thickness of each line or the size of each component illustrated in the drawings may be exaggerated for convenience of description and clarity. Moreover, terms to be described later are terms defined in consideration of functions of the present invention, and these may vary with the intention or practice of a user or an operator. Therefore, such terms should be defined based on the entire content disclosed herein.

Reference will now be made in detail to exemplary embodiments, examples of which are illustrated in the accompanying drawings.

FIG. 1 shows a flow chart of a logic for preventing over discharge of a battery, according to the present invention. As illustrated, the logic for preventing over discharge of a battery is characterized by considering SOC of the battery on the preferential basis at the time of a Slip prior to a Lock-up of an engine and an electric motor and then stopping discharge of the battery at the SOC that is not more than a certain amount so that drop of an engine rpm due to lowering of the SOC. Therefore, a vehicle equipped with the logic for preventing over discharge of a battery prevents discharge of a battery such that the vehicle does not fall into a running disable state that running by the engine only is disable because over discharge of the battery is occurred at the time when the vehicle runs on uphill roads on which the vehicle repeatedly moves and stops and thus the SOC is lowered below the certain amount.

Figure 2:
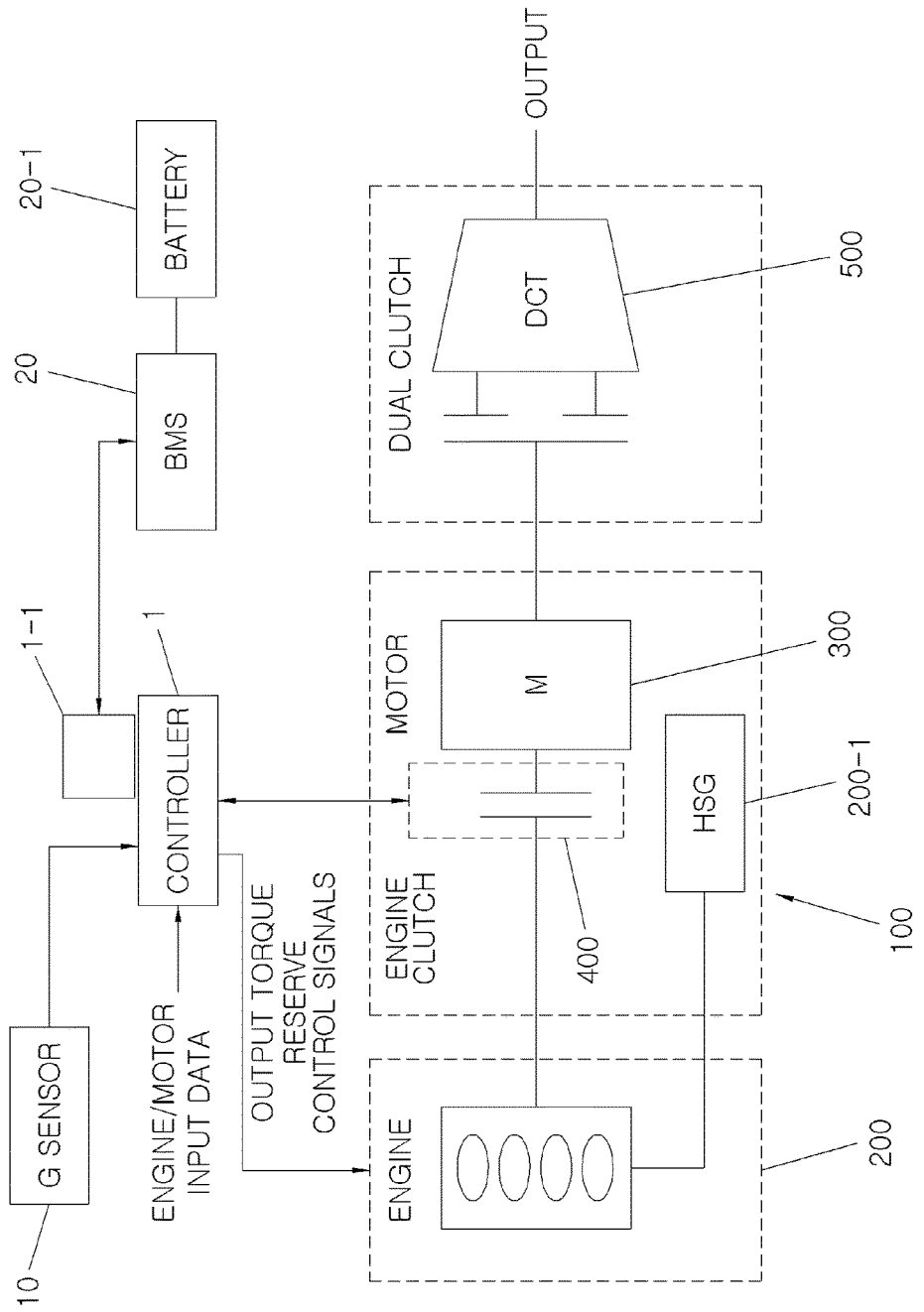
FIG. 2 is a diagram showing an exemplary hybrid vehicle equipped with a controller which performs a logic for controlling over discharge of a battery, according to the present invention.

Meanwhile, FIG. 2 illustrates an exemplary hybrid vehicle equipped with a controller which performs a logic for preventing over discharge of a battery. As illustrated, the hybrid vehicle 100 includes a controller 1 having a clutch slip map 1-1, a G sensor 10 for detecting road gradients, a battery management system (BMS) 20 for controlling SOC of a battery 20-1, an engine 200 having a hybrid starter and generator (HSG) 200-1 connected to crank shafts, an electric motor 300 connected/disconnected to the engine 200 by an engine clutch 400 operating to switch between a REV mode and a EV mode, and a double clutch transmission (DCT) 500 which is controlled by a torque control unit (TCU).

In particular, the controller includes an electric control unit (ECU) 1 for an engine and a hybrid control unit (HCU), wherein the HCU communicates with the controller via a CAN and acts as an upper level controller for controlling the HEV/EV modes and a limp home mode. The clutch slip map 1-1 is established with a table in which engine clutch driving conditions classified as Slip/Lock-up/Open and road gradients of running roads classified as downhill road/flat road/uphill road are associated with each other.

Hereinafter, an embodiment of a method for preventing over discharge of a battery according to the present invention will now be described in detail with reference to FIG. 2. In this case, a control subject is the controller 1 including or connected with the clutch slip map 1-1, while the controller 1 may be an ECU for an engine, an HCU, or a combination of the ECU and HCU performing control cooperatively.

A step S10 is a state that the controller 1 detects that the running vehicle is under a battery discharge running state.

Referring to FIG. 2, the controller 1 detects operating states of the engine 200, the electric motor 300 and the engine clutch 400, respectively, and communicates with the BMS 20 via a CAN network to detect the state of charge by SOC of the battery 20-1.

A step S20 is a state that a vehicle running environment is detected by the controller 1, and a step S30 is a state of determining, by the controller 1, whether or not the running vehicle enters into an uphill road.

Referring to FIG. 2, the controller 1 reads detection values of the G sensor 10 as data for determining gradients of the driving road. The detection values of the G sensor 10 are used in determining whether or not the driving road is a downhill road, a flat road, or an uphill road. Then, the controller 1 determines whether the gradient of the driving road corresponds to any one of a downhill road, a flat road, and an uphill road, using the detection values of the G sensor 10 and the table of the clutch slip map 1-1.

As a result, the controller 1 proceeds to the step S200 and maintains the battery discharge state if the vehicle does not run on the uphill road, whereas the controller proceeds to a step S40 and continues a next step for maintaining a battery charge state if the vehicle runs on the uphill road.

The step S40 is a state that the clutch driving state of the engine clutch 400 is detected by the controller 1, and a step S50 is a state of determining, by the controller 10, whether the engine clutch 400 is under a Slip state.

Referring to FIG. 2, the controller 1 detects the clutch driving state of the engine clutch 400 as any one of Slip, Lock-up and Open, and determines whether or not the engine clutch 400 of the vehicle determined as running on the uphill road based on the table of the clutch slip map 1-1 is under a Slip state.

As a result, the controller 1 proceeds to the step S200 and maintains the battery discharge state if the engine clutch 400 of the vehicle running on the uphill road is not under the Slip state, whereas the controller proceeds to a step S60 and continues a next step for maintaining a battery charge state if the engine clutch 400 of the vehicle running on the uphill road is under the Slip state.

A step S60 is a state that SOC of a battery is detected by the controller 1 and a step S70 is a state of determining, by the controller 1, whether or not the discharge of the SOC continues.

Referring to FIG. 2, the controller 1 detects values of the SOC of the battery 20-1 from BMS 20 at a state that the vehicle is determined as running on the uphill road and the engine clutch 400 as being under a Slip state based on the table of the clutch slip map 1-1, and then performs a determination on the detected SOC and determines whether to continue or interrupt discharge of the SOC. To this purpose, the controller 1 applies a relationship equation of SOC<charge threshold value. Here, "<" denotes an inequality sign indicating the magnitude relationship between two values, "SOC<charge threshold value" means that the detected value of SOC is smaller than the charge threshold. In particular, values of the charge threshold may be a SOC value putting the battery in a charge disable condition or a SOC value at which drop of engine rpm occurs.

As a result, the controller 1 proceeds to the step S200 and maintains the battery discharge state if the detected value of the SOC is not less than the charge threshold value, whereas the controller proceeds to a step S100 and continues a next step for controlling over discharge of a battery if the detected value of the SOC is less than the charge threshold value.

The step S100 is a state that discharge of the battery 20-1 is prevented by control of the controller 1, wherein the controller 1 returns to the step S60 and then proceeds to the step S100 or the step S200 depending on the charge threshold value.

Referring to FIG. 2, the controller 1 prevents discharge of the battery 20-1 by outputting a torque reserve control signal to the engine 200 and allowing more torque to be reserved in the engine 200.

In this regard, it will be appreciated that a typical torque control causes fuel loss due to the fact that an amount of fuel should be additionally injected to maintain an air-fuel ratio because an amount of air remaining in an air intake section enters at the time of torque reduction and then such an amount of excess air exists at the time of adapting a demand torque through adjusting the spark timing, but the torque reserve control means a logic for controlling excess air to achieve an improvement of fuel economy by calculating an amount of air smaller than a demand torque at the time when torque reduction is requested.

As a result, the hybrid vehicle 100 can prevent discharge of the battery 20-1 by reserving more torque of a total output torque in the engine 200 and thus allowing the battery 20-1 to be less consumed.

As discussed above, the method for preventing over discharge of a battery according to this embodiment considers charge threshold values of SOC of the battery 20-1 when the engine clutch 400 slips during the hybrid vehicle 100 runs on an uphill road; the controller 1 controls for preventing over discharge of the battery 20-1 by a torque reserve control of the engine 200 when the battery SOC is less than the charge threshold value under the condition of the uphill road and the slip; and particularly, the controller 1 applied to the hybrid vehicle 100 which runs in mountainous terrains on which the vehicle repeatedly moves and stops and in turn slippage of the engine clutch 400 is caused performs a torque reserve control to protect always the SOC of the battery 20-1 so as not to be lowered to a certain amount and thus prevent any suspension of operation of the hybrid vehicle 100.

While the present invention has been described with respect to the specific embodiments, it will be apparent to those skilled in the art that various changes and modifications may be made without departing from the spirit and scope of the invention as defined in the following claims.

What is claimed is:

1. A method for preventing over discharge of a battery, comprising the steps of:
   detecting a gradient of a road on which a vehicle is running by a controller, when a battery is discharged under a state that an engine of the running vehicle is operated;
   detecting a clutch driving state of an engine clutch, which connects or disconnects the engine and an electric motor, by the controller after detecting the road gradient;
   detecting a SOC (State of Charge) of the battery by the controller after detecting the clutch driving state of the engine clutch; and
   carrying out a torque reserve control allowing more torque to be reserved in the engine by the controller, using a combination of the road gradient, the clutch driving state, and the battery SOC, such that the battery SOC is not lowered below a certain amount.

2. The method of claim 1, wherein the combination comprises an uphill road of the road gradient, a Slip of the clutch driving state, and a charge threshold of the SOC.

3. The method of claim 2, wherein the combination is set as a factor for blocking battery discharge when the Slip occurs on the uphill road and a detection value of the SOC is smaller than the charge threshold, and the controller performs the torque reserve control when the factor for blocking battery discharge is set.

4. The method of claim 1, wherein when the road gradient corresponds to a flat road or a downhill road, the road gradient is set as a factor for maintaining battery discharge, and wherein the controller maintains the battery discharge but do not perform the torque reserve control when the factor for maintaining battery discharge is set.

5. The method of claim 1, wherein when the clutch driving state of the engine clutch corresponds to any one of lock-up and open states, the clutch driving state is set as a factor for maintaining battery discharge, and wherein the controller maintains the battery discharge but do not perform the torque reserve control when the factor for maintaining battery discharge is set.

6. The method of claim 1, wherein when the battery SOC is greater than the charge threshold, the battery SOC is set as a factor for maintaining battery discharge, and wherein the controller maintains the battery discharge but do not perform the torque reserve control when the factor for maintaining battery discharge is set.

7. The method of claim 1, wherein the road gradient is detected by a G sensor, and detection values of the G sensor are provided as input data to the controller.

8. The method of claim 1, wherein the battery SOC is detected by a battery management system (BMS), and detection values of the battery SOC are provided as input data to the controller.

9. A controller configured for use with a vehicle, comprising:
   the controller utilizing charge threshold values of SOC (State of Charge) of a battery when an engine clutch slips during running of the vehicle on an uphill road;
   the controller preventing over discharge of the battery by a torque reserve control when the battery SOC is less than the charge threshold under the condition of the uphill road and the Slip; and
   the controller including a clutch slip map in which classification of downhill, flat, and uphill roads depending on a road gradient, classification of Slip, Lock-up, Open states of the engine clutch, and charge threshold values of the battery SOC are established.

10. A hybrid vehicle comprising:
    a controller including a clutch slip map in which classification of downhill, flat, and uphill roads depending on a road gradient, classification of Slip, Lock-up, Open states of an engine clutch, and charge threshold values of SOC (State of Charge) of a battery are established, the controller utilizing charge threshold values of the battery SOC when an engine clutch slips during a vehicle runs on an uphill road, and the controller preventing over discharge of the battery by a torque reserve control when the battery SOC is less than the charge threshold value under the condition of the uphill road and the Slip;
    an engine and an electric motor as power sources, which are controlled by the controller and connected or disconnected to the engine clutch;
    a G sensor for detecting the road gradient; and
    a battery management system (BMS) for detecting the battery SOC.

11. The hybrid vehicle of claim 10, wherein the controller is an electric control unit (ECU) for an engine and a hybrid control unit (HCU).

12. The hybrid vehicle of claim 11, wherein the HCU communicates with the controller via a CAN and acts as an upper level controller.

\* \* \* \* \*